US005735603A

United States Patent [19]

Kesig et al.

[11] Patent Number: 5,735,603

[45] Date of Patent: Apr. 7, 1998

[54] HORIZONTAL MIXER APPARATUS AND METHOD WITH IMPROVED SHAFT AND SEAL STRUCTURE

[75] Inventors: Ricky D. Kesig; Michael J. Stokes, both of Cincinnati, Ohio; Michael J. Middendorf, Florence, Ky.

[73] Assignee: Littleford Day, Inc., Florence, Ky.

[21] Appl. No.: 642,680

[22] Filed: May 3, 1996

[51] Int. Cl.$^{6}$ .................... B01F 7/00; F16J 15/00

[52] U.S. Cl. .................... 366/331; 366/608; 277/1; 277/12

[58] Field of Search .................... 366/279, 331, 366/608, 241, 97, 98, 99, 64, 66; 277/1, 12, 47; 384/132, 134

[56] References Cited

U.S. PATENT DOCUMENTS

| | | | |
|---|---|---|---|
| 660,532 | 10/1900 | McRae . | |
| 724,086 | 3/1903 | Davis . | |
| 1,562,019 | 11/1925 | Wilkinson . | |
| 1,705,057 | 3/1929 | Brandus | 366/279 |
| 1,746,068 | 2/1930 | Barnes . | |
| 2,008,543 | 7/1935 | Dickinson . | |
| 2,125,446 | 8/1938 | Hurtt . | |
| 2,340,022 | 1/1944 | Shellenberger . | |
| 5,468,071 | 11/1995 | Tourneux et al. . | |

(List continued on next page.)

OTHER PUBLICATIONS

Littleford Day, "Mixers and Mixing Systems Food/Candy Processing" Sales Brochure, 1992, pp. 1–8.

Littleford Day, "Mixer/Granulator" Sales Brochure, 1984, pp. 1–4.

Littleford Day, "Drying Technology" Sales Brochure, 1994, pp. 1–12.

*Primary Examiner*—Tony G. Soohoo
*Attorney, Agent, or Firm*—Wood, Herron & Evans

[57] ABSTRACT

A horizontal mixer for mixing and processing materials includes a horizontally disposed mixing chamber and an elongated rotatable mixing shaft extending longitudinally through the chamber. The drive apparatus is coupled to a drive of the mixing shaft to rotate the shaft and mix material placed in the chamber. A stub end of the shaft has a bearing portion extending through an end wall of the chamber opposite the drive end of the shaft. The bearing portion engages a sleeve bearing which is operable for rotatably supporting the stub end proximate the end wall opening. A sealing shroud is coupled proximate the sleeve bearing and covers an outer portion of the shaft stub end. A static shroud seal is coupled with the sealing shroud at an interface between the shroud and the sleeve bearing. The static shroud is maintained out of direct contact with the rotatable shaft stub end. The sealing shroud and static shroud effectively isolate the shaft stub such that leakage between the chamber and the outside atmosphere is generally prevented.

30 Claims, 3 Drawing Sheets

U.S. PATENT DOCUMENTS

| | | | |
|---|---|---|---|
| 2,621,087 | 12/1952 | Kluge . | |
| 2,635,931 | 4/1953 | May . | |
| 2,688,520 | 9/1954 | Covington . | |
| 2,723,110 | 11/1955 | Collins . | |
| 2,853,020 | 9/1958 | Hollinger et al. . | |
| 2,867,997 | 1/1959 | Lake | 366/331 |
| 2,906,565 | 9/1959 | Scherba . | |
| 2,946,608 | 7/1960 | Gilbert, Sr. . | |
| 2,971,800 | 2/1961 | Ruthner . | |
| 3,068,051 | 12/1962 | Koch . | |
| 3,128,133 | 4/1964 | Audemar . | |
| 3,272,572 | 9/1966 | Lloyd . | |
| 3,318,606 | 5/1967 | Houck . | |
| 3,415,581 | 12/1968 | Seubert . | |
| 3,559,957 | 2/1971 | Hurter . | |
| 3,561,826 | 2/1971 | Cavy et al. . | |
| 3,666,276 | 5/1972 | Hubler . | |
| 3,674,326 | 7/1972 | Kaiser . | |
| 3,679,277 | 7/1972 | Dohmen . | |
| 3,722,834 | 3/1973 | Bakewell . | |
| 3,749,464 | 7/1973 | Satterthwaite . | |
| 3,948,554 | 4/1976 | Mahand . | |
| 3,949,972 | 4/1976 | Bell et al. . | |
| 4,189,242 | 2/1980 | Lüke . | |
| 4,192,559 | 3/1980 | Hewitt . | |
| 4,214,376 | 7/1980 | Lucke et al. . | |
| 4,304,446 | 12/1981 | Goodine . | |
| 4,348,067 | 9/1982 | Tooley . | |
| 4,381,127 | 4/1983 | Tisser . | |
| 4,412,747 | 11/1983 | Moriyama . | |
| 4,509,860 | 4/1985 | Lasar, III . | |
| 4,630,458 | 12/1986 | Kakabaker . | |
| 4,705,222 | 11/1987 | Shobat . | |
| 4,728,198 | 3/1988 | Maekawa et al. | 366/279 |
| 4,775,243 | 10/1988 | Baumgartner . | |
| 4,850,723 | 7/1989 | Whiteman, Jr. | 366/331 |
| 4,878,677 | 11/1989 | Larkins et al. | 366/331 |
| 4,898,714 | 2/1990 | Urban et al. . | |
| 5,056,800 | 10/1991 | Becker | 277/134 |
| 5,094,540 | 3/1992 | Face, Jr. . | |
| 5,275,484 | 1/1994 | Shobat . | |
| 5,277,489 | 1/1994 | Hamm | 366/331 |

HORIZONTAL MIXER APPARATUS AND METHOD WITH IMPROVED SHAFT AND SEAL STRUCTURE

FIELD OF THE INVENTION

This invention relates generally to apparatus and method for industrial mixing and processing and particularly to horizontally arranged industrial mixers having horizontally disposed mixing shafts extending through the mixing chamber.

BACKGROUND OF THE INVENTION

Processing of a large variety of consumer and industrial products, such as food, plastic, pharmaceutical and chemical products, usually involves one or more mixing steps for mixing component materials of the products. Such mixing steps are oftentimes accompanied by simultaneous drying of the material being mixed and granulation or chopping of the material. The techniques of mixing a product with materials in a dry, powdered or granular form, is generally referred to as solids mixing.

For accomplishing such solids mixing, large-capacity industrial mixers are utilized which are able to handle very large loads of material for more efficient and cost-effective mixing. One type of mixer design, which is able to effectively mix large loads of material, is referred to as a horizontal mixer because its elongated mixing chamber is disposed generally horizontally with respect to the ground surface on which it rests. More specifically, horizontal mixers generally comprise a mixing chamber, an elongated, horizontal mixing shaft which rotates, and a plurality of mixing tools which depend generally perpendicularly from the horizontal shaft to rotate around the inside of the chamber. The mixing tools are configured and dimensioned as required for the mixing process to follow the cylindrical inside walls of the chamber for proper mixing of all of the material in the chamber when the shaft rotates. Some such mixing chambers are cylindrically shaped, while others are trough-shaped, such as mixers which are commonly referred to in the art as double-arm mixers or ribbon mixers.

The horizontal mixing shaft extends out of the chamber at both ends through appropriate openings in the chamber end walls or head walls. At one end of the shaft, referred to as the drive end, the shaft is operably coupled to a drive motor for rotating the shaft. At the drive end, the shaft is coupled through a bearing structure located between the drive motor and the chamber. The bearing structure provides support of the shaft drive end and also ensures smooth rotation. A separate seal structure is then located further in along the length of the shaft and interfaces with the opening in the end wall through which the mixing shaft extends. The drive end seal structure, which may be a dynamic seal or mechanical seal, seals the shaft opening and generally prevents the passage or leakage of material into and out of the mixing chamber. The seal structures used in horizontal mixers are important to ensure the integrity and purity of the material being mixed and are also necessary for preventing leaks and protecting the health of workers in the area of the mixers. As may be appreciated, leakage between the horizontal mixing chamber and the atmosphere during mixing is a significant concern.

For example, edible products such as pharmaceuticals and foods must not be contaminated with foreign materials which may leak into the mixing chamber at the shaft openings. As may be appreciated, grease or oil associated with the drive motor and/or the shaft bearings must be kept out of the mixing chamber. Furthermore, it is also equally important to contain the mixed material in the chamber and to prevent it from migrating and leaking outside through the shaft openings. This is particularly so if the material being mixed is a harmful chemical which cannot be directly contacted by the skin or if the mixed material produces a harmful vapor which may be released through the shaft openings. Oftentimes, carcinogenic materials are mixed in horizontal mixers, and it is particularly important to prevent the escape of the material or the vapors associated therewith.

Still further, it may be necessary to maintain a pressure differential within the horizontal mixing chamber for proper mixing. For example, some mixing procedures may require elevated pressures within the chamber which tend to force mixed material out through the seals. Other procedures require that a vacuum be drawn in the chamber, thus tending to draw contaminants into the chamber through the seals.

As a result, conventional horizontal mixers utilize complicated bearing structures and separate seal structures which may include elaborate and complicated dynamic seals with braided packing elements that surround the rotating shaft or expensive mechanical seals. The packing elements of the dynamic seals are constantly worn by the rotation and movement of the shaft and thus are prone to leakage. Some such seals are coupled to an air line for preventing migration or leakage of the mixed material out of the chamber or the leakage of contaminants into the chamber. Conventional mechanical seals have highly polished faces which spin against each other under pressure. Such mechanical seals are often expensive due to the precise machining and polishing necessary for their operation and are also subject to wear and leakage.

The problem of leakage at the shaft ends of a horizontal mixer is further exacerbated by the requirement of a seal at the stub end or non-driven end of the shaft. The stub end generally utilizes a separate bearing structure located out on the end of the shaft spaced from the end wall of the chamber. A dynamic or mechanical seal, similar to the seal at the drive end, is coupled to the end wall inwardly on the shaft from the separate bearing structure. The stub end dynamic seal is prone to both rotational and translational wear and leakage rather than just the rotational wear experienced at the drive end as discussed below.

Therefore, currently available horizontal mixers using expensive and elaborate combinations of intricate bearings and dynamic or mechanical seal structures at the stub end of the shaft have numerous drawbacks. First, the requirement of having another separate bearing structure and another separate sealing structure which must be separately fabricated and installed at the stub end increases the overall cost of the mixer. Furthermore, the complicated and involved dynamic seal designs or the expensive mechanical seals currently used at the stub end of the horizontal mixers also increase the cost of manufacturing a mixer. Additionally, as mentioned above, the existing stub end seal structures used with horizontal mixers are prone to leakage, and thus, require maintenance in the form of replacing the worn packing elements or other mechanical sealing elements to prevent leaks. During such maintenance, whether scheduled or unscheduled, the mixer cannot operate, thus reducing the efficiency of the mixing process and reducing the cost-effectiveness of the mixer.

Bearing failure from leakage may also be a problem. The bearings used with conventional horizontal mixers are intricately designed and have balls, rollers or other moving components which are lubricated with free lubricants, such as grease or lubricating oil. When the seals leak, the mixed material may migrate to the bearing and be trapped in the various cavities containing the balls, rollers and other components and thus contaminant the lubricants. As a result, the bearing may wear prematurely and be damaged, or the bearing may even lock up and hinder the rotation of the shaft. Additionally, the mixed material may be chemically reactive and may corrode the bearing.

Leakage at the stub end sealing structure is particularly a problem with existing horizontal mixers because once the mixed material passes out of the chamber, it is exposed to the atmosphere. That is, there is generally no additional structure adjacent the failed seal structure to further prevent leakage. The bearing is spaced away from the stub end sealing structure and away from the end of the chamber and thus does not provide any sealing properties. Furthermore, the existence of the separate bearing prevents additional sealing structures from being utilized. As a result, the operation and the integrity of the stub end sealing structure is a predominant concern when using horizontal mixers. As mentioned, some mixing material may be carcinogenic, and thus leaks may expose workers proximate to the mixers to carcinogens, toxic gases or other dangerous chemicals.

The stub end seal structure is particularly prone to failure and leakage because of its position on the shaft. More specifically, the stub end of the shaft not only rotates, but also moves in a longitudinal direction or in the direction of the longitudinal, horizontal axis of the shaft as the shaft expands and contracts in length due to the temperature changes associated with the metal shaft. Since, the drive end of the shaft is somewhat fixed due to the drive motor and other associated components, the longitudinal translation of the shaft caused by expansion and contraction of the shaft occurs primarily at the stub end. The translational movement of the shaft is due to its constant exposure to the variations in temperature caused by the heating and cooling of the chamber and the heat generated by the mixing process. Furthermore, the shaft itself may be actually heated or cooled such as by introducing steam, water or oil into a cavity in the shaft. Still further, the end walls or end plates of the mixing chamber will move in and out longitudinally with respect to the shaft due to temperature variations of the chamber. Therefore, the seal structure and the packing elements at the stub end are exposed not only to rotational wear but also to translational wear, thus making the stub end seal structure particularly prone to failure and leakage.

Shaft deflection is also a concern associated with currently available horizontal mixers. The rotating shafts of horizontal mixers are designed to handle a certain amount of stress and to only deflect a predetermined amount due to the sag in the shaft between its supported ends. With stress and deflection as a limiting criteria, the shafts are designed and sized in diameter to achieve the acceptable deflection. For example, a deflection of 1/16 of an inch may be acceptable in one mixer design, and thus the diameter of the shaft will have to be sized accordingly. As will be appreciated, convention horizontal mixers which support the shaft ends at spaced apart bearings will require relatively large diameter shafts thus increasing the costs of the mixer. A larger diameter shaft will also require larger bearing and sealing components, thus further increasing the costs of the mixer.

Accordingly, there is a need for a structure for both sealing and providing rotational support of the mixing shaft of a mixer. There is particularly a need for a structure for sealing, supporting and rotating the shaft stub end in a horizontal mixer.

It is an objective of the present invention to address the drawbacks of the prior art and to provide a mixer which is less expensive to fabricate and requires less maintenance than currently available mixers.

It is another objective to prevent leakage of mixed materials from the mixing chamber to the atmosphere and to prevent the leakage of outside contaminants into the mixing chamber.

It is another objective of the present invention to rotationally seal the ends of the mixing shaft of a horizontal mixer. It is particularly an objective to provide an improved rotational seal system for the stub end of the mixing shaft.

It is another objective of the invention to reduce the maintenance required for the sealing and bearing arrangements in a horizontal mixer and particularly the maintenance at the stub end of the mixer shaft. To that end, it is an objective to reduce the number of moving bearing parts which may become contaminated and subsequently fail.

It is still another objective to reduce the cost and complexity of the sealing and bearing arrangement in a horizontal mixer at the stub end of the mixing shaft.

It is still another objective of the invention to utilize a small diameter shaft to decrease the cost of the mixer.

It is another objective of the invention to reduce the affect of lateral and rotational wear on the stub end sealing structure to reduce the seal failure associated with such wear and reduce the required maintenance for the sealing structure.

It is still another objective of the invention to provide proper rotational support and sealing of the mixing shaft stub end to prevent any migration or leakage of foreign contaminants into the mixer and also to prevent the migration or leakage of the mixed materials out of the mixer.

SUMMARY OF THE INVENTION

The above-referenced objectives and other objectives are achieved by the horizontal mixer of the present invention which provides an improved sealing and bearing structure for the stub end of the rotating mixing shaft and improves the operation of the shaft and the sealed integrity of the mixing chamber. The invention reduces the necessary maintenance on the mixer and provides an inexpensive yet durable stub end seal which is liquid and vapor tight and which prevents leakage into and out of the mixing chamber.

To that end, the horizontal mixer of the present invention comprises a generally elongated chamber which is horizontally disposed and has an inside space configured for receiving material to be mixed. An elongated rotatable mixing shaft extends longitudinally though the chamber space and has opposing ends which extend through openings in the end walls or head walls of the chamber. The shaft is preferably coaxially mounted with the chamber so that it rotates in the center of the inside space. A drive end of the shaft is operably coupled to a drive motor through an appropriate coupling, and the drive end is rotatably supported by a bearing structure. At the respective end wall opening, a separate seal structure provides a dynamic seal between the end wall of the chamber and the drive end of the rotating shaft to prevent material from migrating into or out of the chamber along the shaft through the drive end wall opening. The drive end bearing structure is constructed to handle a substantial portion of the shaft load which is translated to the drive end. Appropriate mixing tools are attached generally perpendicular to the axis of the shaft to sweep around the inside chamber space and provide mixing within the chamber.

In accordance with the principals of the present invention, a stub end of the rotatable shaft extends through the other end wall opening opposite the drive end of the shaft. The shaft stub end includes a bearing portion, and in a preferred embodiment of the invention, a hardened, wear-resistant steel sleeve is coupled to the stub end at the bearing portion. A sleeve bearing is positioned proximate the end wall and operably engages the bearing portion and sleeve of the stub end of the shaft. The sleeve bearing is positioned proximate the end wall opening and is operable for rotatably supporting and sealing the shaft stub end close to the end wall. A bearing housing coupled to the end wall supports the sleeve bearing and maintains it in proper engagement with the shaft stub end. A retaining ring is mounted within a housing groove proximate the outside end of the bearing to confine the bearing, while a shoulder of the housing at the inside end of the bearing further confines the bearing. In that way, the invention is not particularly susceptible to the different expansion characteristics between the housing and bearing when heat is generated during the rotation of the shaft, and the bearing is maintained in the proper position.

The sleeve bearing is preferably formed of a low-friction composite material for providing smooth rotation of the shaft stub end. Furthermore, the sleeve bearing is dimensioned in length to provide a proper amount of contact with the stub end sleeve for efficient rotation and for the necessary support required by the stub end.

The horizontal mixer of the invention further comprises a sealing shroud coupled proximate the sleeve bearing and operable for covering an outer portion of the shaft stub end. The sealing shroud is preferably coupled to the bearing housing at an interface. A static shroud seal is coupled between the bearing housing and shroud at the interface, and thereby, the static shroud seal is maintained out of direct contact with the rotatable shaft in accordance with the principles of the invention. The sealing shroud and the static shroud seal effectively and operably isolate the shaft stub such that any leakage through the sleeve bearing and stub end between the chamber space and atmosphere is generally prevented. Since the static shroud seal and shroud are not affected by the rotation or longitudinal movement of the shaft, the seal integrity of the stub end is maintained. The unique seal and bearing system of the invention reduces maintenance and provides proper containment of the mixed material and any vapors associated therewith. Furthermore, the shroud is preferably sized to provide room for the shaft to longitudinally expand and contract during mixing.

The unique combination of the sleeve bearing and static seal structure and shroud of the present invention are relatively inexpensive and durable and reduce the labor and material costs associated with sealing and supporting the stub end of the mixing shaft. The seal achieved by the invention is more durable than prior art dynamic seals and thus reduces leakage between the chamber space and atmosphere. The stub end seal, which generally receives the most wear in a horizontal mixer, is out of direct contact with the rotating shaft and thus is not subject to the intense wear presented by the rotating shaft. Furthermore, necessary maintenance and the resulting shutdown of the mixing process required for such maintenance is also reduced.

The sleeve bearing structure of the invention eliminates various moving bearing parts and components to conventionally used with mixers, such as ball bearings and roller bearings. Therefore, bearing failure is reduced and the inventive mixer requires less maintenance.

The unique rotational support and sealing of the shaft stub end within the end wall opening provides support of the shaft closer to the chamber and thus reduces the diameter of the shaft necessary for achieving the desired deflection. Accordingly, the resulting costs of manufacturing and sealing and supporting the shaft are reduced.

A further benefit of the present invention over the existing art is the elimination of a separate bearing structure positioned and spaced out on the end of the shaft. Therefore, the stub end of the shaft is generally not confined in the longitudinal direction and the shaft is free to expand and contract in length without damaging the bearing and seal structure and without putting any unnecessary stress on the shaft. Furthermore, the sealing capacity of the invention is not susceptible to lateral wear caused by such expansion and contraction because the static shroud seal is isolated from the rotating shaft.

The static shroud seal and shroud provide a liquid tight and vapor tight seal around the shaft stub end. The shroud preferably includes inlet and outlet ports for introducing a fluid, such as water or a suitable liquid, or pressurized nitrogen or some other suitable gas, around the shaft stub end. For example, pressurized nitrogen might be utilized to purge product from the bearing and thereby extend the life of the bearing. Any vapors or materials leaking through the sleeve bearing will be maintained by the shroud and static seal, which are not affected by the rotation of the shaft or the wear on the sleeve bearing.

To further extend bearing life, one embodiment of the invention comprises a dynamic seal structure which surrounds the stub end of the shaft and engages the sleeve proximate an inside end of the sleeve bearing. The dynamic seal is operable for sealing the sleeve bearing and the end wall of the chamber proximate the inside of the chamber during rotation of the shaft to prevent leakage to and through the sleeve bearing. The dynamic seal of the invention is preferably a lip seal comprising a wear-resistant and chemical-resistant contact portion, e.g., Teflon, which engages the shaft sleeve and is held in contact therewith by a more rigid metallic portion. An operable spring may be provided for further biasing the wear-resistant contact portion against the smooth surface of the sleeve. The dynamic seal prevents accelerated wear of the sleeve bearing by keeping mixed material from migrating between the sleeve bearing and housing or stub end sleeve.

In one embodiment of the invention, the bearing housing is coupled to a head plate, which, in turn, is coupled to the chamber end wall or head wall. For enhancing the seal integrity at the stub end wall opening, a static head seal structure, such as a rubber O-ring, is coupled at the interface between the bearing housing and the head plate to provide a seal at the interface.

To further seal the shaft stub end and prevent leakage, a static sleeve seal structure is utilized at the inside end of the shaft sleeve between the sleeve and the bearing portion of the shaft for preventing any migration of materials out of the chamber through the shaft and sleeve interface.

An alternative embodiment of the invention comprises a bearing housing mounted directly to the end wall. By mounting, the bearing housing directly to the chamber end wall the additional head plate is eliminated. The interface between the end wall and mounting collar is sealed by a static seal structure in accordance with the principles of the invention.

The structure of the present invention simultaneously provides a sealing and supporting structure for the stub end of the horizontal mixing shaft of the horizontal mixer which is inexpensive, durable and low maintenance. The horizontal mixer is properly sealed to prevent leakage between the chamber and the atmosphere. Furthermore, the unique construction of the invention reduces shaft diameter and thus reduces the cost of the mixer. The stub end is also vapor sealed and harmful vapor leakage is thus generally eliminated.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention, and together with a general description of the invention given above, and the detailed description of the embodiments given below, serve to explain the principles of the invention.

DETAILED DESCRIPTION OF SPECIFIC EMBODIMENTS

Figure 1:
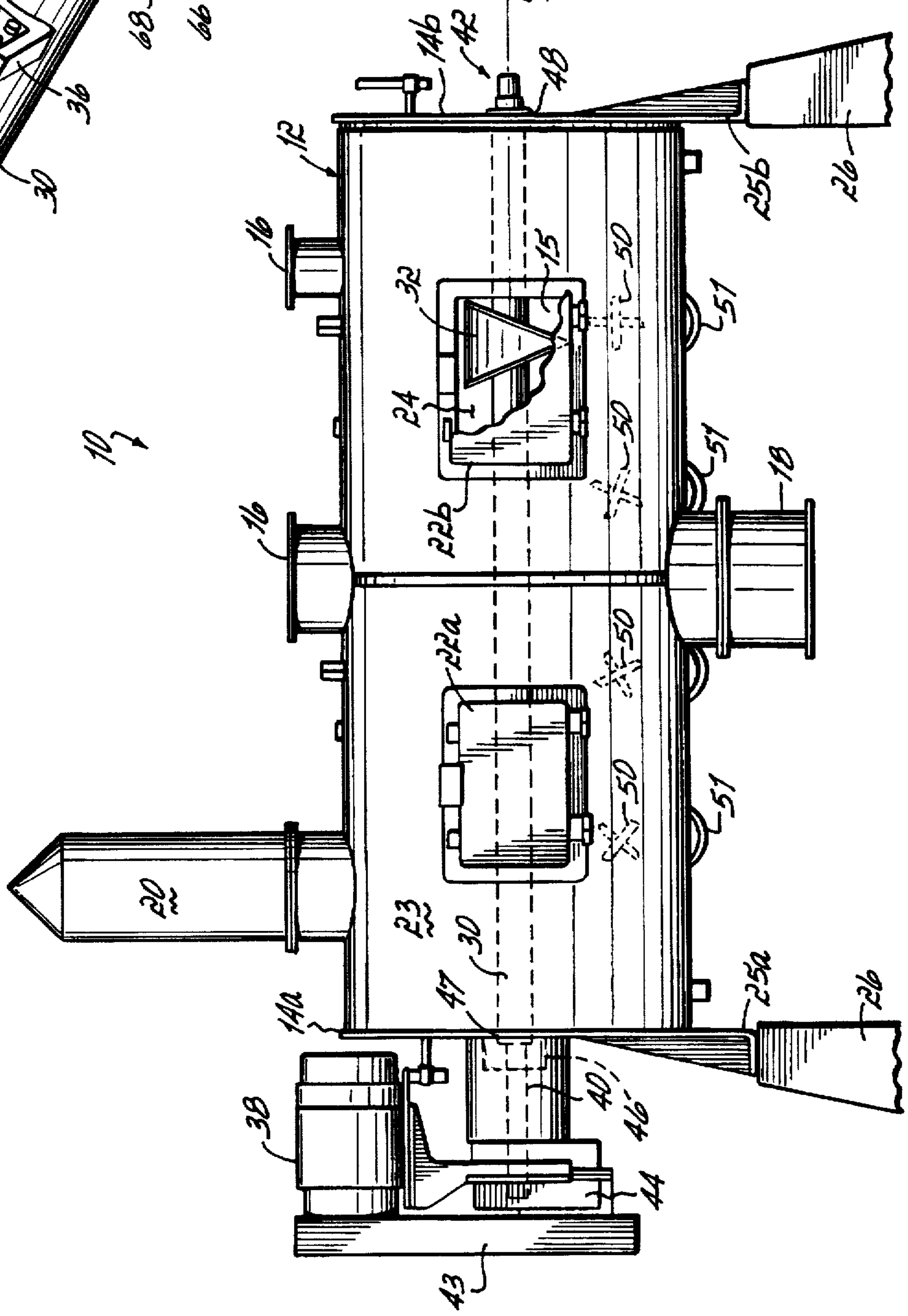
FIG. 1 is a front view of a horizontal mixer constructed in accordance with the principles of the present invention.

FIG. 1 illustrates a horizontal mixer 10 constructed in accordance with the principles of the present invention. The embodiment of the mixer 10 illustrated in FIG. 1 comprises a generally cylindrical and elongated mixing chamber 12 which is horizontally disposed and configured to receive therein material which is to be mixed, such as powered food material, pharmaceutical material or plastic material, for example. The cylindrical chamber 12 has a generally cylindrically-shaped side wall and opposing end walls or head walls **14*a*, 14*b* which close the ends of the chamber to contain the mixed material. The chamber defines an inside mixing space 15** for mixing the material. Although a cylindrically-shaped chamber is illustrated, other horizontal mixer shapes, such a trough-shaped mixers commonly referred to as ribbon mixers or double-arm mixers might also be utilized in accordance with the principles of the invention. Other shapes of horizontal mixers might also be utilized.

Mixer 10 further includes one or more charge ports 16 and one or more discharge ports 18 utilized for charging the chamber with materials to be mixed and discharging the mixed material from chamber 12 after it has been properly mixed. The horizontal mixer 10 of the invention may also include a ventilation port 20 or other appropriate structure for ventilating any fumes or vapors generated during the mixing process and also for facilitating charge and discharge of product. Furthermore, other apparatuses, such as heaters (not shown), may also be utilized with horizontal mixer 10 in order to dry or heat the material being mixed. Access to the inside of chamber 12 is provided by access doors **22*a*, 22*b* which are hingedly coupled to the outside surface 23 of the cylindrical side wall of the chamber 12**.

The inside surface 24 of the cylindrical side wall which defines inside space 15 is preferably polished so that the mixed material slides easily thereover for mixing and discharging as required. Chamber 12 is generally a large capacity mixer in the range of approximately 300–30,000 liters and therefore, the components of the mixer are expected to handle substantial mixing loads. The end walls **14*a*, 14*b* include respective leg extension portions 25*a*, 25*b* which are mounted on an appropriate support structure 26 for elevating the mixing chamber 12 and particularly the discharge port 18 above a ground surface. Alternatively, mixer 10 might be mounted directly on the ground as long as sufficient clearance of discharge port 18** is provided.

For mixing within space 15 of chamber 12, the horizontal mixer 10 of the invention further comprises a horizontal mixing shaft 30, having a longitudinal axis 31 which is horizontally disposed so that the shaft is preferably coaxially mounted with the cylindrically-shaped chamber 12. Shaft 30 is heavily constructed for handling the large load mixing of horizontal mixer 10 and is preferably fabricated of 316 stainless steel having an outer diameter in the mixing chamber in the range of approximately 2¼ inches to 16 inches. The length of the shaft 30 will vary with the capacity of the mixer 10. As described further hereinbelow, the ends of the shaft 30 neck down to an outer diameter appropriate for coupling to support and drive structures.

Figure 2:
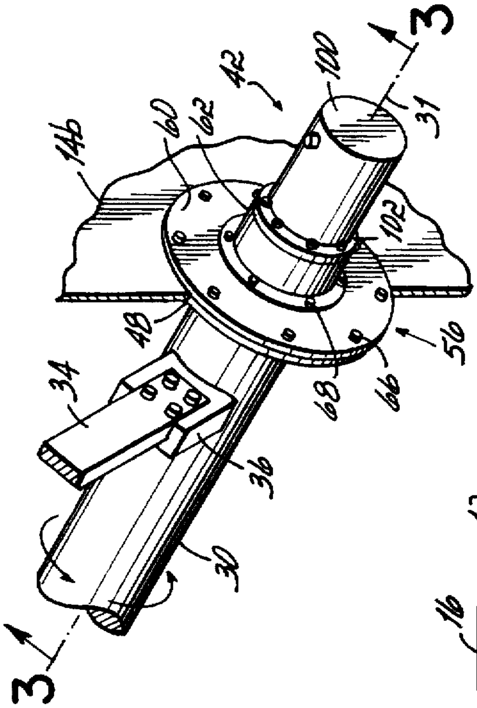
FIG. 2 is a perspective view, partially cut-away, of the shaft stub end of the horizontal mixer illustrated in FIG. 1.

A plurality of mixing tools, such as mixing plows 32, are coupled to the shaft 30 by support arms 34 which are appropriately fixed or bolted to plow pockets 36 secured to shaft 30 (see FIG. 2). Preferably, the mixing tools 32 are staggered both longitudinally on shaft 30 and also radially around shaft 30 as appropriate to provide proper mixing. The support arms 34 and the mixing tools 32 are configured so that the head or plow of the mixing tool sweep freely past the polished inside surface 24 of the cylindrically-shaped chamber 12. The spacing of the tools 32 from the inside surface 24 is varied depending upon the mixing process. In that way, the mixing tools can engage, move, and therefore mix the material in the chamber without leaving any residual material unmixed against the inside surface 24 of the side wall. Therefore, proper spacing between the mixing tools 32 and surface 24 is desirable.

As may be appreciated, the length of shaft 30 will inherently create a certain amount of deflection in the shaft 30 because it is supported only at its ends. The amount of deflection and stress on shaft 30 will then determine what kind of shaft diameter is necessary for the desired deflection and proper spacing of the mixing tools during mixing. As may be appreciated, the farther the distance between the points of support at the ends of the shaft, the greater the amount of deflection and stress and thus the larger the shaft diameter required. Currently available horizontal mixers utilize heavily-designed, large diameter shafts to obtain the required deflection. However, such shafts are more expensive to fabricate and are also more difficult to seal given the larger diameter and the greater surface area that must be sealed. The present invention reduces the diameter of the shaft necessary to achieve the desired deflection as discussed below while providing improved sealing at the shaft ends.

Shaft 30 of the invention includes a driven end or drive end 40 and a non-driven end or stub end 42 opposite the drive end 40. A drive motor 38 is operably coupled to a belt drive 43 which, in turn, is operably coupled to the shaft drive end 40 by an appropriate gear box and bearing structure 44. The gear box and bearing structure 44 will generally reduce the drive ratio between the drive motor 42 and shaft 30. An elaborate dynamic seal structure 46 is coupled to drive end 40 between the gear box and bearing structure 44 and the respective chamber end wall 14*a*. The shaft drive end 40 protrudes through an appropriate opening 47 in end wall 14*a* while the stub end 42 protrudes through an appropriate opening 48 in the end wall 14*b*.

The dynamic seal structure 46 seals opening 47 to prevent the migration of mixed material out of chamber 12 and into the atmosphere along the shaft 30 and through the opening 47. Seal structure 46 may comprise a series of adjacent braided packing elements (not shown) and also may include an air line (not shown) for preventing leakage as discussed above. Furthermore, seal structure 46 preferably prevents any entry of foreign matter into the mixing chamber 12 through opening 47. Seal structure 46 is an appropriate dynamic seal for sealing the shaft drive end 40 and the opening 47 while allowing rotation of the shaft 30. To that end, sealing structure 46 might also utilize appropriate air or fluid lines (not shown) to maintain a vacuum or pressurized environment within chamber 12 as necessary for properly mixing and containing the material in chamber 12.

As illustrated in FIG. 1, drive motor 38 is indirectly coupled to shaft drive end 40 by belt drive 43 and is positioned above the shaft drive end 40. However, for larger mixer applications and for a higher power drive motor, the drive motor 38 might be directly coupled to shaft 30 by an appropriate gear and coupling structure, bearing structure, and a separate seal structure.

Horizontal mixer 10 might also be utilized for granulating material as it is mixed. To that end, horizontal mixer 10 might include chopper blades 50 coupled to appropriate motors 51 for grinding, chopping and granulating the material during the mixing process.

FIG. 2 illustrates an enlarged view of the shaft stub end 42 of the present invention including a structure constructed in accordance with the principles of the present invention for supporting the stub end 42 of shaft 30 and also sealing the opening in end wall 14*b*. Referring now to FIG. 3, the support structure 56 of the invention simultaneously seals and rotatably supports the shaft stub end 42 to prevent leakage and migration of the mixed material out of the chamber at the stub end and also to prevent the leakage and introduction of foreign material into the chamber through the stub end.

In accordance with one embodiment of the invention, the support structure 56 for shaft stub end 42 comprises a head plate 60 and a bearing housing 62. The bearing housing 62 supports and contains a sleeve bearing 64 which is preferably fabricated of a low-friction composite material such as a carbon graphite fibers and polymide binder composite material available from HyComp of Cleveland, Ohio. A small diameter bearing portion 43 of the shaft stub end 42 interfaces and cooperates with sleeve bearing 64 for rotation of shaft 30.

Head plate 60 is mounted to end wall 14*b* to seal the opening 48 and is held to end wall 14*b* by appropriate fasteners, such as bolts 66. Bearing housing 62 which is stainless steel in one embodiment of the invention, is then, in turn, interfaced with and fastened to head plate 60, such as with bolts 68. An inside shoulder 69 of bearing housing 62 couples to an inward radial wall of head plate 60 at interface 70. A static seal structure or head seal 72, such as a rubber O-ring, is positioned in a groove 71 formed in housing 62 proximate interface 70. Static head seal 72 seals interface 70 and generally prevents any escape of vapors or mixing material from inside chamber 12. Similarly, migration or leakage of foreign contaminants into the mixed material through interface 70 is also generally prevented.

Sleeve bearing 64 has an appropriate key formation 64*a* formed thereon which is received by a respective groove 62*a* in bearing housing 62. The sleeve bearing 64 is preferably key fit to the bearing housing 62 around the shaft stub end 42. In that way, as shaft 30 rotates, the sleeve bearing 64 is maintained in place. A retaining ring 74 fits within an appropriate groove formed in bearing housing 62. Retaining ring 74 confines the outside end 75 of the sleeve bearing 64 to prevent the sleeve bearing from sliding longitudinally outwardly on the shaft stub end 42 during rotation. A shoulder 77 formed on bearing housing 62 further confines the sleeve bearing 64 at the inside end 79 of the sleeve bearing. During rotation of the shaft to mix material within chamber 12, the shaft stub end 42, sleeve bearing 64 and bearing housing 62 may heated, cooled or at steady stated. Bearing housing 62 will expand when heated and is preferably formed of 316 stainless steel and thus will expand substantially more than the composite sleeve bearing 64. Accordingly, the key fit of bearing 64 in the housing 62 and the retaining ring 74 and shoulder 77 ensure that the sleeve bearing is maintained within its optimal position with respect to the shaft stub end 42 and housing 62.

For smooth rotation and durability, the invention further comprises a hardened, wear-resistant sleeve 76 which encircles a section of bearing portion 42 and is therefore disposed between the shaft bearing portion 43 and the sleeve bearing 64. Sleeve 76 is formed of a wear-resistant material, such as 17-4 stainless steel, and provides a contact surface for bearing 64 so that shaft bearing portion 43 is not worn during rotation of the shaft. A plurality of set screws 78 surround the stub end 42 and secure sleeve 76 to the shaft bearing portion 43. A slight gap 80 is maintained between the sleeve 76 and shaft bearing portion 43 along a portion of the length of sleeve 76 to promote the sliding of sleeve 76 onto shaft bearing portion 43 and the positioning of the sleeve thereon. Sleeve 76 thus rotates with shaft 30 and bears against the sleeve bearing 64 for rotational support.

Sleeve bearing 64 may be a continuous composite element as illustrated in FIG. 3 or may be a plurality of adjacent elements positioned end to end. The unique support and seal structure 56 of the present invention including sleeve bearing 64 provides rotational support of shaft 30 very close to the inside 15 of the chamber. That is, shaft 30 is supported at a point very close to the end wall 14*b* and thus very close to the main body of shaft 30. In that way, the present invention significantly reduces the amount of space between the supported ends of the shaft and reduces the moment forces on the shaft. The invention thus reduces the amount of deflection experienced by a shaft 30 of a particular diameter as opposed to the substantial deflection experienced in prior art configurations utilizing a separate ball-bearing or other bearing structure, which is positioned to support shaft 30 a substantial distance away from end wall 14*b* and further out on the reduced-diameter shaft stub end 42.

Therefore, the shaft 30 may be made with a smaller diameter and still be able to withstand the resultant mixing forces and only deflect the desired amount. This reduces the costs of fabricating the shaft and supporting and sealing the shaft and thus reduces the overall costs of the mixer.

Additionally, the composite sleeve bearing 64 of the invention is a durable bearing structure which is relatively inexpensive to fabricate. The sleeve bearing 64 provides proper rotational support of shaft 30 and is wear-resistant for reduced maintenance. Also, the sleeve bearing does not include any additional moving components, such as ball bearings or roller bearings which are subject to failure. Still further, the sleeve bearing of the invention will not generally trap mixed material in the bearing structure and thus will reduce wear, corrosion and failure associated with trapped material. The reduction of the shaft size and weight also provides more uniform lengthwise contact between shaft bearing portion 43 and the sleeve bearing 64 to prevent uneven wear of the sleeve bearing and to prolong its useful life.

The interface 82 between the shaft stub end 42 and sleeve 76 is sealed by an appropriate static sleeve seal structure 84, such as a rubber O-ring seal, which fits into an appropriate groove formed in the inside wall of sleeve 76. Static sleeve seal structure 84 seals interface 82 and prevents the migration or leakage of mixing material out of chamber 12 along the shaft bearing portion/sleeve interface 82. Furthermore, contaminants are prevented from leaking into the mixing chamber 12 through interface 82.

Further in accordance with the principles of the present invention, a static sealing structure is used to seal the stub end 42 and prevent leakage between chamber space 15 and the outside atmosphere. The static sealing structure of the invention is not worn or affected by the rotational and translational movement of the stub end of shaft 30.

Referring to FIG. 3, the horizontal mixer of the present invention comprises a sealing shroud 100 which is generally positioned over a portion of the shaft stub end 42 and particularly over the shaft bearing portion 43. Sealing shroud 100 includes an annular lip or collar 102 for coupling the sealing shroud 100 to chamber end wall 14*b*, and more specifically, to the bearing housing 62 by appropriate fasteners, such as bolts 104. A static shroud seal structure or seal 106, formed of a high temperature-resistant material, such as VITON rubber, for example, is positioned between lip 102 and the outside end of the bearing housing 62 at the interface 63 therebetween. Shroud seal structure 106 and shroud 100 seal the shaft stub end 42 for preventing leakage between the atmosphere and chamber 12.

Figure 3A:
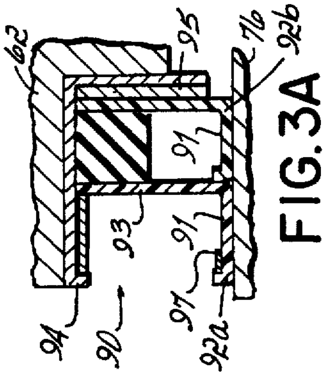
FIG. 3A is an enlarged cross-sectional view of the dynamic seal structure of the invention shown in FIG. 3.
Figure 3:
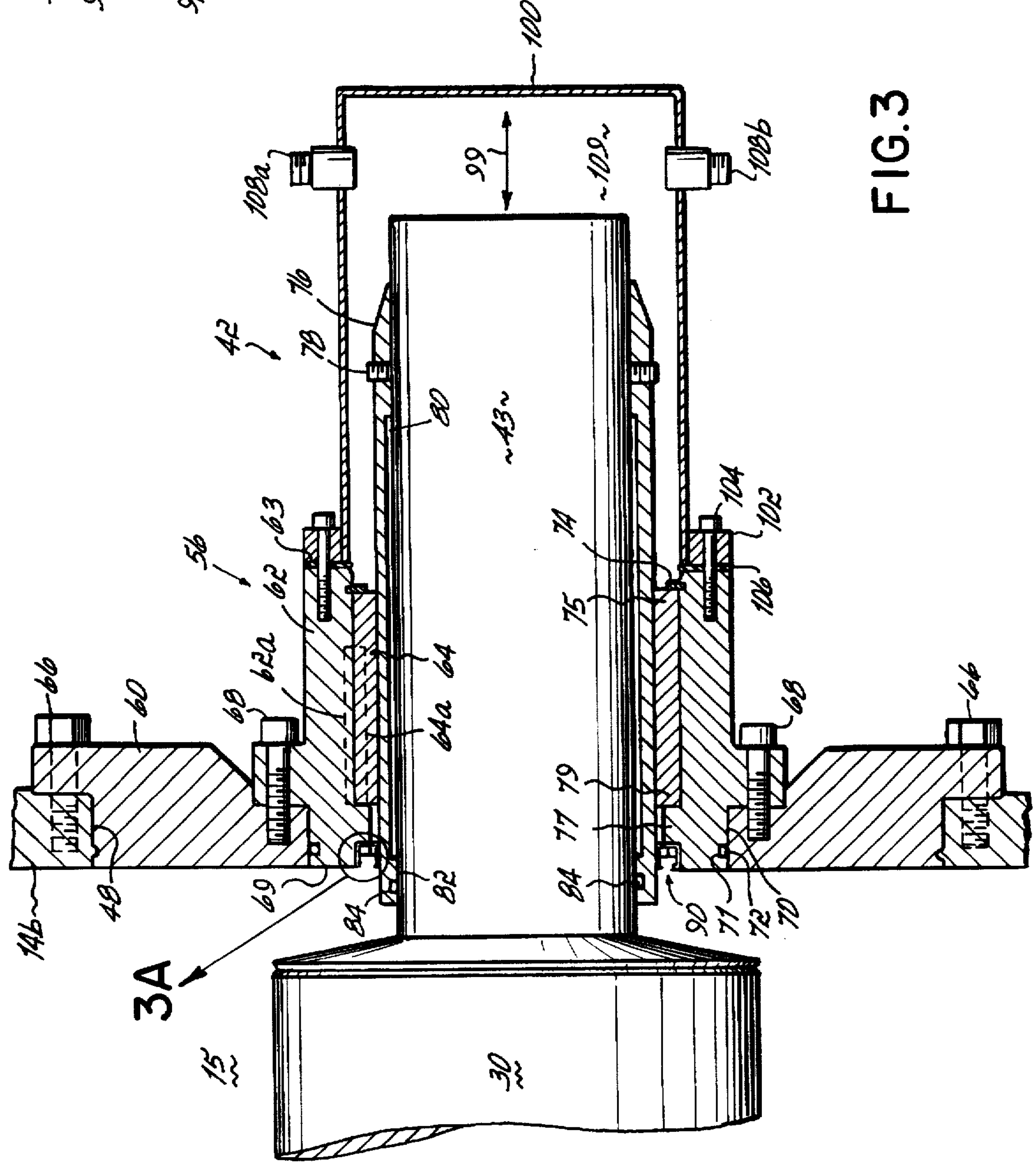
FIG. 3 is a cross-sectional view along lines 3—3 of FIG. 2 illustrating the mixing shaft stub end in accordance with the principles of the present invention.
Figure 4A:
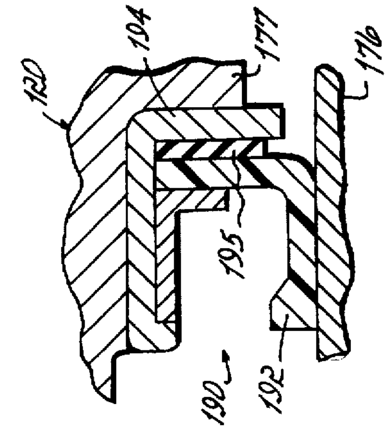
FIG. 4A is an enlarged cross-sectional view of an alternative embodiment of the dynamic seal structure of the invention shown in FIG. 4.
Figure 4:
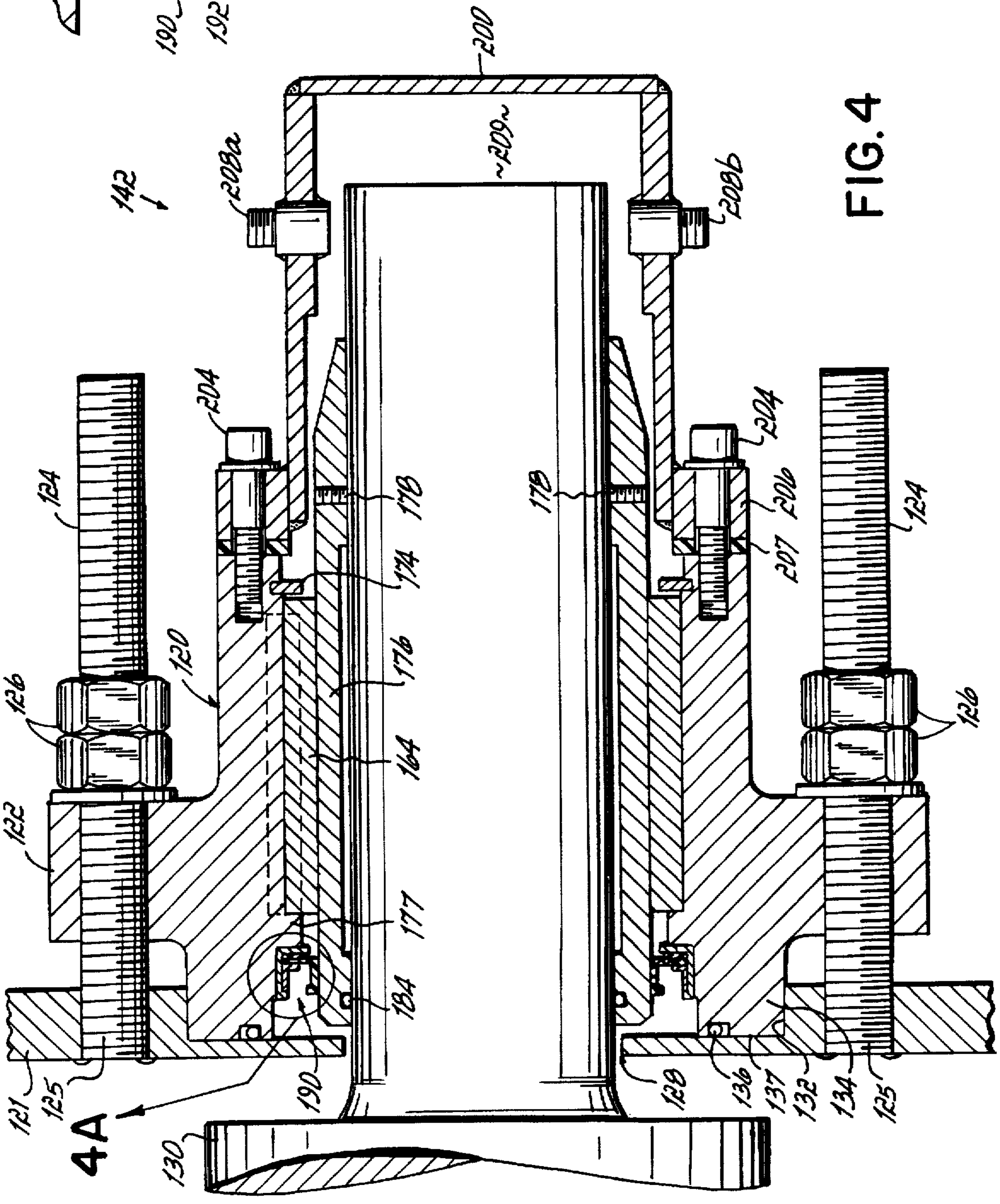
FIG. 4 is a cross-sectional view of an alternative embodiment of the invention showing the mixing shaft stub end.

In one embodiment the shroud seal 106 is in the form of a gasket structure as shown in FIGS. 3 and 4. The static shroud seal 106 is coupled between the bearing housing 62 and shroud 100 at interface 63, and is thus maintained out of direct contact with the rotatable shaft 30. Therefore, rotational or lateral movement of the shaft 30 does not affect the integrity of the seal 106 by wearing on the seal 106. That is, there is no direct rotational or translational wear on seal 106 provided by rotating shaft 30. Therefore, shroud seal 100 does not have to be replaced as often as prior art dynamic seals which leak due to wear. Furthermore, the static shroud and shroud seal are significantly less expensive to manufacture and thus to replace than prior art dynamic seals. The shroud 100 and static shroud seal 106 of the invention effectively seal the stub end 42 of shaft 30 to prevent leakage at the stub end between the chamber and atmosphere. The static seal and shroud are durable and require very little maintenance, and any leakage through the stub end 42, such as through sleeve bearing 64 is contained by the shroud 100 and seal 106.

The unique shroud 100 and static shroud seal structure 106 of the present invention also effectively contain the vapors associated with the mixing process within a space confined between the sealing shroud 100 and the stub end 42. To further enhance vapor containment, sealing shroud 100 may include inlet and outlet fluid ports 108*a*, 108*b* which are utilized appropriately to introduce or evacuate a fluid, such as a liquid or gas. For example, water might be flushed into the inside of sealing shroud 100 to clean the shaft stub end 42, such as if leakage occurred through sleeve bearing 64. Alternatively, pressurized nitrogen ($N_2$) might be utilized to create a pressure differential between the space 109 defined by sealing shroud 100 and the space 15 inside of chamber 12. The pressure in the shroud space 109, for example, would be maintained higher than the internal pressure in the interior space 15 of chamber 12 thus further preventing any leakage or migration of vapors and material out of chamber 12 through the interface of the sleeve bearing 74 and sleeve 76, or the interface of the sleeve 76 and the shaft bearing portion 43.

Since shroud seal 106 of the invention is a static seal, the vapor integrity of the horizontal mixer 10 of the present invention is not susceptible to the rotational wear or longitudinal wear from shaft 30. This provides a significant advantage over the prior art which utilizes braided packing elements in a dynamic seal or precisely machined surfaces in mechanical seals which are all particularly susceptible to failure and leakage of both mixed material and vapors due to rotation and translation of the shaft. Therefore, maintenance on the mixer seal structures is further reduced. While pressurized fluids may be used with shroud 100 of the present invention, the shroud and shroud seal 106 effectively seal the stub end 42 without pressurized fluids.

Further in accordance with the principles of the present invention, the horizontal mixer 10 comprises a dynamic seal structure or seal 90 which surrounds the shaft stub end 42 and more particularly surrounds bearing portion 43. The dynamic seal structure 90 engages the outer surface of bearing portion 43, or in the embodiment illustrated in FIG. 3, the outer surface of wear-resistant sleeve 76. The dynamic seal structure 90 is positioned proximate the inside end 79 of sleeve bearing 64 which is confined by shoulder 77 of the bearing housing 62. The dynamic seal structure 90 engages the outer surface of sleeve 76 and provides a seal between sleeve bearing 64 and the inside area 15 of mixing chamber 12. Seal structure 90 is dynamically operable and will seal the sleeve bearing from the inside of chamber 12 during rotation of shaft 30. Dynamic seal structure 90 is utilized to prevent leakage through sleeve bearing 64 and thus improve the overall life of the sleeve bearing of the invention. Furthermore, the prevention of foreign materials between the shaft and sleeve bearing increases the life of the bearing.

Referring now to FIG. 3A, an enlarged view of the dynamic seal structure 90 of the embodiment of the invention illustrated in FIG. 3 is shown. The dynamic seal structure 90 of one embodiment of the invention is a lip seal design and comprises a pair of seal glands or elements 92*a*, 92*b* which abut each other and engage the rotating sleeve 76 of shaft 30. As illustrated in FIG. 3A, each of the sealing elements 92*a*, 92*b* is generally L-shaped having an inner portion 91 which extends generally parallel to the sleeve 76 and which engages sleeve 76, and an elongated outer portion generally perpendicular to sleeve 76 which engages a metal case 94. The outer portion 93 of the seal elements 92*a*, 92*b* are preferably pressure fitted into appropriately formed grooves in the metal case 94. A gasket 95 lies between the sealing element 92*b* and case 94. An appropriate sealing structure is available from Parker Packing GMP of Hampshire, Ill.) and includes a case 94 of 304 stainless steel, sealing elements 92*a*, 92*b* of carbon fiber-filled teflon P837 and a gasket which is a fluorocarbon elastomer.

Dynamic seal structure 90, in combination with the sealing shroud 100, shroud seal 106 and sleeve bearing 64 of the invention provides a unique sealing and supporting structure 56 which adequately seals and supports the stub end 42 of the horizontal mixer 10. To further enhance the seal created by the dynamic seal structure 90, a spring device 97 may be used in conjunction with structure 90, such as around element 92*a*. Spring device 97 further biases the element 92*a* against the sleeve 76 to enhance the seal. Dynamic seal structure 90 prevents the leakage of any mixed material out of chamber 12 and into contact with the sleeve bearing 64. Dynamic seal structure 90 further prevents contaminants, which might seep or leak through the sleeve bearing 64, from entering chamber 12. Additionally, the dynamic seal structure 90 generally prevents mixing material from migrating to the interface between the sleeve bearing 64 and sleeve 76 thus preventing premature wear of the sleeve bearing 64 as mentioned above. The seal structure 90 is particularly durable and wear-resistant.

As discussed, the present invention requires less maintenance and is not subject to the frequent seal failure and leakage associated with prior art stub end seal structures. Therefore, appropriate maintenance can be scheduled and the horizontal mixer 10 of the invention is not as prone to an unscheduled cessation of the mixing process which occurs with prior art horizontal mixers. Furthermore, the invention does not require constant lubricating or grease packing as is necessary with other mixers using roller of ball bearings.

Accordingly, the present invention provides low maintenance and durable sealing and support of the stub end of a horizontal mixer shaft and thus eliminates the failure-prone sealing structures of the prior art and the separate bearing structures utilized in conjunction with the prior art dynamic seals. Furthermore, the unique combination of elements including the sleeve bearing, sealing shroud and shroud seal does not restrict the outermost end 98 of the shaft stub end 42. When the shaft 30 expands and contracts in length due the heat or cooling during mixing, the stub end will slide or translate freely left or right as illustrated in FIG. 3 by arrow 99 with generally little or no effect on the operation of the shroud and shroud seal 90 and the sleeve bearing 64.

Referring again to FIG. 1 the stub end 42 of shaft 30 would generally see the most longitudinal translation because the drive end 40 is fixed to the appropriate gearing and coupling box 44 so as to restrict movement at the drive end. The shaft 30 expands and contracts and seals move back and forth on the shaft due to constant temperature variations in the shaft and chamber. The chamber 12 is often heated and cooled. Furthermore, the shaft may be heated or cooled by introducing a liquid or gas into a cavity (not shown) in the shaft. Also, the mixing process itself generates heat. The longitudinal expansion and contraction of the shaft provides translational movement of the shaft and thus wears the prior art dynamic seals coupled to the shaft stub end. The end walls of the chamber also move, providing additional wear on any stub end seal structures.

Prior art dynamic seal and bearing structures at the mixer stub end were therefore particularly susceptible to both rotational wear and translational wear as the shaft rotated and expanded and contracted longitudinally in length. The invention provides a horizontal mixer which is resistant to failure caused by rotational and longitudinal movement of the mixing shaft 30, because the sealing shroud and static shroud seal are maintained away out of direct contact with the shaft stub end 42. The sealing shroud is also dimensioned to allow such translational expansion.

FIG. 4 illustrates an alternative embodiment of the invention and comprises a bearing housing 120 which couples directly to an end wall 121 of a horizontal mixing chamber. To that end, the bearing housing includes a radial flange 122 which receives an appropriate bolt structure or bolt 124 for securing the bearing housing 120 to the horizontal mixer. Bolt 124 is secured to end wall 121, such as by a plug weld at the inside end 125. Nut structures 126 may be tightened on bolt 124 to properly seat the bearing housing 120. The end wall 121 includes an opening 128 through which the stub end 142 of shaft 130 extends. Adjacent the opening and surrounding the opening, an annular shoulder 132 receives a horizontally projecting collar structure 134 of the bearing housing 120. A static seal structure 136, such as an O-ring, rests within an annular groove formed in the annular collar structure 134. Seal structure 136 effectively seals the interface 137 and operates to prevent leakage at the interface into the atmosphere.

The embodiment illustrated in FIG. 4 utilizes a wear resistant sleeve 176 similar to sleeve 76 illustrated in FIG. 3. Sleeve 176 is fixedly secured to the shaft stub end by the set screws 178 and is sealed at its inside end by an appropriate static seal structure 184. A sleeve bearing 164 is securely key mounted within bearing housing 120 as discussed hereinabove and is longitudinally contained on the shaft by a shoulder 177 and a retaining ring 174 to prevent longitudinal movement along the shaft stub end 142 when the stub end, bearing housing 120 and bearing 164 expand due to the heat generated during the mixing process. Sleeve bearing 164 is preferably a friction resistant composite as discussed hereinabove.

The embodiment illustrated in FIG. 4 utilizes a dynamic seal structure 190 which provides a dynamic seal proximate the inside end of the sleeve bearing to prevent leakage of materials into and out of the horizontal mixing chamber as discussed hereinabove. The dynamic seal structure 190 further prevents materials from migrating into the interface between sleeve bearing 164 and wear resistant sleeve 176 to thereby prevent premature wear of the bearing.

Referring to FIG. 4A, the dynamic seal structure 190 comprises a corrosion resistant metallic case 194 into which a wear-resistant seal element 192 is pressure fit against a gasket 195. A suitable dynamic seal structure is available from Parker Packing GMP and includes a case 194 of 304 stainless steel, a seal 192 of Ekonol filled Teflon and a gasket 195 which is a fluorocarbon elastomer.

The embodiment illustrated in FIG. 4 further comprises a sealing shroud 200 in accordance with the invention, which is mounted to bearing housing 120 by appropriate bolt structures 204 which extend through openings in a lip or collar 206. The interface between the collar 206 and the bearing housing 120 is sealed by a static shroud seal structure or seal 207, such as a high temperature-resistant gasket, to provide a seal at the stub end and thus contain any material or vapors which may pass from the chamber space 15 of the horizontal mixer and through the sleeve bearing and sleeve structures at the shaft stub end 142. Ports 208*a* and 208*b* and sealing shroud 200 may be utilized to introduce a liquid or gas into space 209 defined between the sealing shroud 200 and the shaft stub end 142 as discussed hereinabove.

The embodiment of the invention illustrated in FIG. 4 has all the advantages of the embodiment illustrated in FIG. 3 and provides a support and seal structure for the shaft stub end 142 which is low maintenance, durable, and adequately prevents leakage of the mixed material or vapors to the atmosphere or contamination of the mixed material by an outside foreign contaminant, such as grease or oil. Furthermore, the shaft stub end 142 is unrestricted so that longitudinal expansion may occur without significantly effecting the sleeve bearing 164 and the dynamic seal structure 190 of the invention.

Accordingly, the invention provides a horizontal mixer having an improved structure for sealing and providing rotation of the stub end of a horizontal mixing shaft which reduces the maintenance required for the mixer and also reduces the cost and complexity of the mixer. The present invention reduces the diameter of the mixing shaft to reduce costs. The present invention includes a generally unitary bearing and seal combination which is very durable and more resistant to failure from the rotational and longitudinal movement of the rotating shaft than are the conventional separate seal bearing and structures utilized with prior art horizontal mixers.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A horizontal mixer for mixing and processing materials comprising:

a mixing chamber having a wall defining an inside chamber space configured for receiving material to be mixed;

an elongated rotatable mixing shaft extending through the chamber space, the shaft having a stub end and a drive end, the stub end extending through an opening in the chamber wall;

a bearing operably engaging the shaft stub end, the bearing operable for rotatably supporting said stub end proximate the opening when the shaft rotates;

a sealing shroud supported from the chamber and covering the opening proximate the shaft stub end;

a static shroud seal sealingly disposed between the chamber and sealing shroud for statically sealing the opening, said static shroud seal being out of direct contact with said rotatable shaft end, such that the sealing shroud and seal generally prevent leakage between the chamber and outside atmosphere proximate the shaft stub end.

2. A horizontal mixer for mixing and processing materials comprising:

a mixing chamber generally horizontally disposed and having an inside chamber space configured for receiving material to be mixed;

an elongated rotatable mixing shaft extending longitudinally through the chamber space and having opposing ends, each end extending through a respective opening in an end wall of the chamber, the shaft including at least one mixing element coupled thereto;

a drive apparatus operably coupled to a drive end of the mixing shaft for rotating the shaft and mixing element to mix material placed in the chamber space;

a stub end of the shaft having a bearing portion extending through said end wall opening opposite the drive end of the shaft;

a sleeve bearing operably engaging said bearing portion of the shaft stub end, the sleeve bearing operable for rotatably supporting said stub end proximate the respective end wall opening when the shaft rotates;

a sealing shroud coupled with the chamber proximate said shaft stub end, the sealing shroud covering a portion of the shaft stub end;

a static shroud seal disposed between said sealing shroud and said chamber, the static shroud seal being out of direct contact with said rotatable shaft stub end;

the sealing shroud and static shroud seal effectively isolating the shaft stub end such that leakage through the sleeve bearing and stub end between the chamber space and outside atmosphere is generally prevented;

whereby the shaft stub end is durably supported and is sealed from the atmosphere.

3. A horizontal mixer as in claim 2, further comprising a dynamic seal structure surrounding a portion of the stub end of the shaft and operable for sealing an end of said sleeve bearing proximate the inside of the chamber space during rotation of the shaft.

4. A horizontal mixer as in claim 3 wherein the dynamic seal includes a wear-resistant material element which engages a surface of the shaft to provide a durable seal proximate the chamber end wall.

5. A horizontal mixer as in claim 4 further comprising a biasing element to bias the wear-resistant material element against the shaft stub end.

6. A horizontal mixer as in claim 2 further comprising a sleeve coupled to the stub end of the shaft, the sleeve operably engaging the sleeve bearing and providing smooth rotation of the shaft during mixing.

7. A horizontal mixer as in claim 6 wherein the sleeve is fabricated of hardened steel.

8. A horizontal mixer as in claim 6 further comprising a static sleeve seal operably coupled between the sleeve and the shaft.

9. A horizontal mixer as in claim 2 further comprising a bearing housing coupled with said chamber end wall proximate the shaft stub end for supporting the sleeve bearing proximate the end wall, the sealing shroud coupled with the bearing housing.

10. A horizontal mixer as in claim 9 further comprising a head plate coupled with the bearing housing for coupling the bearing housing with the chamber end wall.

11. A horizontal mixer as in claim 10 further comprising a static head seal coupled between the bearing housing and the head plate for reducing leakage of the mixed material at the shaft stub end.

12. A horizontal mixer as in claim 9 further comprising a static seal coupled between the end wall and the bearing housing for reducing leakage of the mixed material at the shaft stub end.

13. A horizontal mixer as in claim 2 wherein the stub end of the shaft is generally free from confinement in the longitudinal direction, the sealing shroud providing an area for the longitudinal expansion of the shaft during rotation.

14. A horizontal mixer as in claim 2 further comprising fluid ports in said sealing shroud for introducing one of a liquid and a gas between the sealing shroud and the shaft stub end.

15. A horizontal mixer as in claim 2 further comprising a retaining ring positioned proximate an outer end of the sleeve bearing to confine the sleeve bearing.

16. A horizontal mixer as in claim 2 wherein the static shroud seal includes a gasket structure.

17. A horizontal mixer as in claim 2 wherein the static shroud seal is formed using a high temperature-resistant material.

18. A horizontal mixer as in claim 2 wherein the sleeve bearing is fabricated of a low friction composite material.

19. A horizontal mixer for mixing and processing materials comprising:

a mixing chamber having an inside chamber space configured for receiving material to be mixed and including a rotatable mixing shaft extending through the chamber and having opposing ends, each end extending through a respective opening in a chamber end wall, the shaft including at least one mixing element coupled thereto;

a stub end of the shaft extending through the respective end wall opening;

a sleeve bearing operably engaging said shaft stub end and operable for rotatably supporting said stub end proximate the end wall opening when the shaft rotates;

a sealing shroud coupled with the chamber proximate said sleeve bearing, the sealing shroud covering a portion of the shaft stub end;

a static shroud seal disposed between said sealing shroud and said chamber, the static shroud seal being out of direct contact with said rotatable shaft stub end;

the sealing shroud and static shroud seal effectively isolating the shaft stub end such that leakage through the sleeve bearing and stub end between the chamber space and outside atmosphere is generally prevented;

whereby the shaft stub end is durably supported and is sealed from the atmosphere.

20. A horizontal mixer as in claim 19 further comprising a bearing housing coupled with said chamber end wall proximate the shaft stub end for supporting the sleeve bearing proximate the end wall, the sealing shroud coupled with the bearing housing at an interface.

21. A horizontal mixer as in claim 19 further comprising fluid ports in said sealing shroud for introducing one of a liquid and a gas between the sealing shroud and the shaft stub end.

22. A horizontal mixer as in claim 19 wherein the static shroud seal includes a gasket structure.

23. A horizontal mixer as in claim 19 wherein the static shroud seal is formed using a high temperature-resistant material.

24. A stub end seal structure for supporting and sealing the stub end of a horizontal mixer shaft which extends through an opening in an end wall of the mixer chamber, the seal structure comprising:

a sleeve bearing operably engaging said shaft stub end and operable for rotatably supporting said stub end proximate the end wall opening when the shaft rotates;

a sealing shroud configured for coupling with the chamber proximate said sleeve bearing, the sealing shroud covering a portion of the shaft stub end;

a static shroud seal disposed between said sealing shroud and said chamber, the static shroud seal being out of direct contact with said rotatable shaft stub end;

the sealing shroud and static shroud seal effectively isolating the shaft stub end such that leakage through the sleeve bearing and stub end between the chamber space and outside atmosphere is generally prevented and generally unaffected by the rotation of the mixer shaft;

whereby the shaft stub end is durably supported and is sealed from the atmosphere proximate the chamber end wall.

25. A stub end seal structure as in claim 24 further comprising a bearing housing configured for coupling with said chamber end wall proximate the shaft stub end for supporting the sleeve bearing proximate the end wall, the sealing shroud coupled with the bearing housing.

26. A stub end seal structure as in claim 24 further comprising fluid ports in said sealing shroud for introducing one of a liquid and a gas between the sealing shroud and the shaft stub end.

27. A stub end seal structure as in claim 24 wherein the static shroud seal is formed using a high temperature-resistant material.

28. A method for sealing a horizontal mixer at the stub end of the rotatable mixer shaft which extends through an opening in the mixer chamber end wall, the method comprising:

coupling a sleeve bearing with the chamber end wall and operably engaging said shaft stub end with the sleeve bearing for rotatably supporting said stub end proximate the end wall opening;

coupling a sealing shroud with the chamber proximate said sleeve bearing and covering a portion of the shaft stub end with the sealing shroud;

said coupling step including disposing a static shroud seal between said sealing shroud and said chamber and maintaining the static shroud seal out of direct contact with said rotatable shaft stub end for effectively isolating the shaft stub end such that leakage through the sleeve bearing and stub end between the mixer and outside atmosphere is generally prevented.

29. The method of claim 28 further comprising introducing one of a liquid and a gas between the sealing shroud and the shaft stub end.

30. The method of claim 28 further comprising using a static shroud seal formed using a high temperature-resistant material.

* * * * *

UNITED STATES PATENT AND TRADEMARK OFFICE

CERTIFICATE OF CORRECTION

PATENT NO. : 5,735,603

DATED : April 7, 1998

INVENTOR(S) : Ricky D. Kesig et al

It is certified that error appears in the above-identified patent and that said Letters Patent is hereby corrected as shown below:

On the Title page, item [54], and in Col. 1, line 3:
Title should read --HORIZONTAL MIXER APPARATUS AND METHOD WITH IMPROVED SHAFT END SEAL STRUCTURE Column 4, line 23, "affect" should read -- effect --;

Column 4, line 48, "though" should read -- through --;

Column 4, line 66, "principals" should read -- principles --;

Column 5, line 62, at the end of the line delete "to";

Column 7, line 49, "such a" should read -- such as --;

Column 9, line 49, "fibers" should read -- fiber --;

Column 10, line 15, "may heated" should read -- may be heated --;

Column 10, line 15, "at steady stated" should read -- or may be maintained at a steady state --;

Column 13, line 23, "of" should read --or --;

UNITED STATES PATENT AND TRADEMARK OFFICE

CERTIFICATE OF CORRECTION

PATENT NO. : 5,735,603

DATED : April 7, 1998

INVENTOR(S) : Ricky D. Kesig, et al.

It is certified that error appears in the above-identified patent and that said Letters Patent is hereby corrected as shown below:

Column 13, line 33, "due the head" should be read -- due to the heat --; and

Column 14, line 66, "effecting" should be read as -- affecting --.

Signed and Sealed this

Twenty-second Day of December, 1998

Attest:

BRUCE LEHMAN

*Attesting Officer* *Commissioner of Patents and Trademarks*